US006531976B1

(12) United States Patent
Yu

(10) Patent No.: US 6,531,976 B1
(45) Date of Patent: Mar. 11, 2003

(54) ADAPTIVE DIGITAL BEAMFORMING RADAR TECHNIQUE FOR CREATING HIGH RESOLUTION RANGE PROFILE FOR TARGET IN MOTION IN THE PRESENCE OF JAMMING

(75) Inventor: Kai Bor Yu, Niskayuna, NY (US)

(73) Assignee: Lockheed Martin Corporation

( * ) Notice: Subject to any disclaimer, the term of this patent is extended or adjusted under 35 U.S.C. 154(b) by 0 days.

(21) Appl. No.: 09/948,959

(22) Filed: Sep. 7, 2001

(51) Int. Cl.[7] .............................. G01S 7/36; G01S 13/00
(52) U.S. Cl. ............................. 342/16; 342/13; 342/74; 342/81; 342/128; 342/130; 342/131; 342/132; 342/195; 342/196
(58) Field of Search .................................. 342/13–21, 82, 342/175, 195, 74–81, 83–103, 159–164, 367–377, 378–384, 118, 128, 129–146, 196, 25, 176, 179

(56) References Cited

U.S. PATENT DOCUMENTS

| 3,747,097 A | * | 7/1973 | Howard ........................ 342/80 |
| 3,813,670 A | * | 5/1974 | Alpers .......................... 342/95 |
| 4,229,738 A | * | 10/1980 | Campbell ..................... 342/95 |
| 5,594,451 A | * | 1/1997 | Krikorian et al. ........... 342/160 |
| 5,600,326 A | * | 2/1997 | Yu et al. ...................... 342/17 |
| 5,952,965 A | * | 9/1999 | Kowalski .................... 342/372 |
| 5,990,823 A | * | 11/1999 | Peele et al. ................... 342/90 |

* cited by examiner

Primary Examiner—Bernarr E. Gregory
(74) Attorney, Agent, or Firm—Duane Morris LLP

(57) ABSTRACT

A wideband adaptive digital beamforming technique for maintaining a high range resolution profile of a target in motion in the presence of jamming utilizes a sequence of adaptively calculated narrowband jamming cancellation weights. The adaptive weights are calculated such that the desired frequency dependent gain is maintained toward the target center. These adaptive weights tend to preserve the range profile quality and low range sidelobes. This technique also tends to eliminate signal cancellation problems as well as adaptive weight modulation effects.

20 Claims, 4 Drawing Sheets

ADAPTIVE DIGITAL BEAMFORMING RADAR TECHNIQUE FOR CREATING HIGH RESOLUTION RANGE PROFILE FOR TARGET IN MOTION IN THE PRESENCE OF JAMMING

FIELD OF THE INVENTION

The present invention relates generally to radar processing and more specifically, to a radar process and system for creating and maintaining the quality of a high resolution range profile for a target in the presence of jamming.

BACKGROUND

Modern radar systems having high resolution capability are useful in many situations, such as target detection, target discrimination, target recognition, and terrain imaging. Such radar systems are frequency agile and operate at rapidly varying frequencies. These radar systems are vulnerable to diverse threats such as intentional jamming, spoofing, and radar frequency interference (RFI). Also, in air and missile defense applications, the target platform may also comprise countermeasures such as jamming and chaff.

Of particular interest are systems having high resolution in range. The performance of high range resolution (HRR) systems is degraded in the presence of jamming interference. Typically, jamming is in the form of a high power transmission designed to impair a radar system's performance. Jamming may comprise a signal modulated with noise or other disruptive information. The object of typical jammers is to impair the performance of a radar system's receiving electronics and/or obscure display of potential targets of interest. The source of jamming interference may be mobile or may be relatively stationary (e.g., land based systems). HRR processing is vulnerable to interference due to jamming because it requires a relatively wide operational bandwidth, thus increasing the chances that a jammer at a particular frequency will be in the operational bandwidth. HRR processing is also vulnerable to jamming interference because of the relatively long coherent integration time associated with HRR processing. This increases the likelihood that a jammer will transmit while the HRR echoes are being received. Therefore, to avoid performance degradation due to jamming interference, it is desirable to eliminate jamming interference from the received signal (e.g., via cancellation, attenuation).

Jamming interference is typically cancelled by adaptively forming beam patterns, wherein nulls of the beam patterns are steered in the direction of the source(s) of jamming interference. Many existing adaptive techniques require a training period in which a signal is not present (such as during a passive listening period), or a period in which the signal value is low compared to jamming interference (such as in a search radar system) in order to distinguish signal energy from jammer energy. However, during HRR processing, signal content is available in all frequency samples. Thus, conventional adaptive techniques may cancel desired signal content in addition to canceling jamming interference. Also, conventional adaptive techniques tend to modulate the signal of interest, causing degradation in sidelobe performance, as a result of changing adaptive weight values. Thus, conventional adaptive techniques may degrade the image quality of an HRR profile.

Wideband jamming cancellation, in conjunction with stretch processing, was introduced in a document entitled "Nulling Over Extremely Wide Bandwidths When Using Stretch Processing", proceedings of Adaptive Sensor Array Processing (ASAP), March 1999. The technique introduced in that document processed a wideband signal as a sequence of narrowband signals. However, this technique does not address the signal cancellation or the adaptive weight modulation problems described above. Thus a need exists for an HRR process that can create an HRR profile and maintain the quality of the profile in the presence of countermeasures.

SUMMARY OF THE INVENTION

A system and method for creating a high resolution range (HRR) profile for a radar target of interest in the presence of jamming interference include transmitting an HRR waveform and receiving an echo signal resulting from the transmitted HRR waveform. Beam patterns are formed for each echo signal segment of the echo signal such that at least one null of each beam pattern is steered toward at least one interference and a frequency dependent gain of each beam pattern is maintained toward the center of the target of interest. The HRR profile is created from the beam patterns.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION

It is an object of many radar systems to obtain long detection range and fine range resolution. High range resolution (HRR) processing is advantageous, inter alia, to distinguish targets that are relatively close together, to create detail target images, to aid in target recognition, and to form detailed ground images. One means for accomplishing this objective is to transmit an HRR waveform, which provides the desired average power (thus providing desired detection range) and decoding the received echoes resulting from the HRR waveform(s) via pulse compression, and performing a weighted inverse fast Fourier Transform (FFT).

Figure 1A:
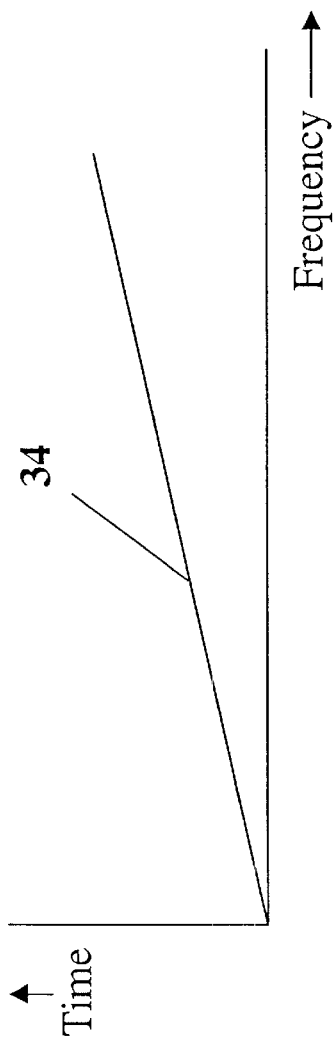
FIG. 1A is a graph of an exemplary relationship between time and frequency of a chirp waveform, in accordance with an embodiment of the present invention.

An HRR waveform may comprise a continuous LFM (linear frequency modulated) chirp waveform or a stepped frequency waveform (pulses of energy). FIG. 1A is a graph of an exemplary relationship between time and frequency of a chirp waveform, in accordance with an embodiment of the present invention. A chirp waveform is a waveform wherein the frequency of the waveform is either increased or decreased at a constant rate with respect to time. Curve 34 indicates the frequency of an exemplary chirp waveform as a function of time. Curve 34 is monotonically increasing, although in another embodiment of the invention, curve 34 is monotonically decreasing. Curve 34 is depicted as a straight line, indicating a linear relationship between the frequency and time of the generated waveform. Although a linear HRR waveform is described herein, a nonlinear HRR waveform, such a parabolic HRR waveform, is also envisioned.

Figure 1B:
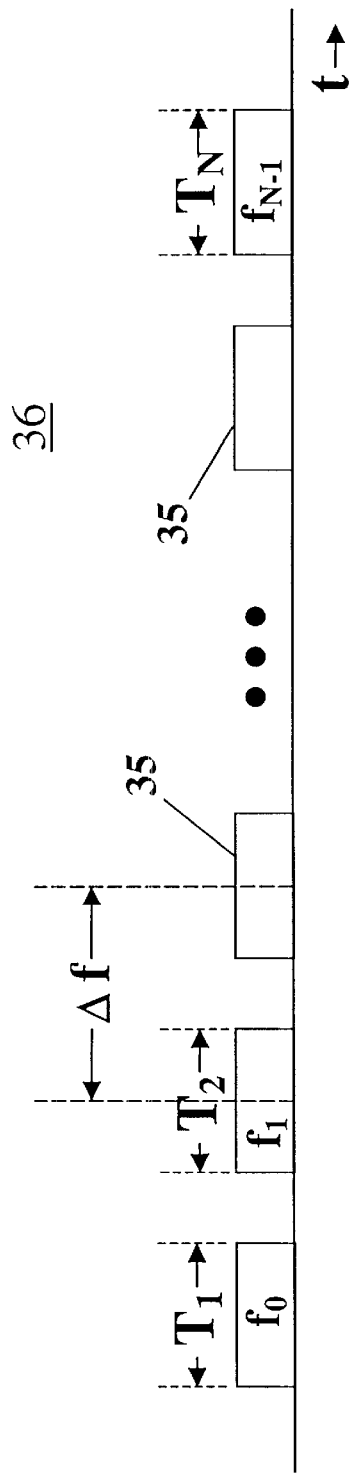
FIG. 1B is a diagram of an envelope of an exemplary stepped frequency waveform 36 in accordance with an embodiment of the present invention.

FIG. 1B is a diagram of an envelope of an exemplary stepped frequency waveform 36 in accordance with an embodiment of the present invention. Waveform 36 comprises a plurality of waveform segments 35 each having a different frequency, $f_1$ through $f_{N-1}$. Frequencies $f_0$ through $f_{N-1}$ may increase or decrease with respect to time. The duration, in time, of each waveform segment is denoted as $T_1$ through $T_N$, respectively. In an exemplary embodiment of the invention, durations $T_1$ through $T_N$ are equal. The separation between waveform segments 35 is $\Delta f$. In an exemplary embodiment of the invention, $\Delta f$ is the same between all segments 35 of waveform 36.

Pulse compression comprises a delay line or filter (or similar means), that introduces a time delay into a signal. The time delay is inversely proportional to the frequency of the signal. Thus, the introduced time delay decreases with frequency at the same rate as the frequency of the echoes increases. For example, referring to FIG. 1B, if $f_0$ is the highest frequency and $f_{N-1}$ is the lowest frequency, $f_1$ will take less time to pass through the pulse compressor than $f_{N-1}$. Also, echoes resulting from each segment 35 of a transmitted HRR waveform will be delayed in the same manner. The result is that all frequencies are aligned at the output of the pulse compressor to the same time. Thus, the information contained in each echo resulting from each transmitted waveform segment 35 are superimposed upon one another. Thus, echoes from closely spaced targets are merged in the received echo resulting from the HRR waveform, but are separate at the output of the pulse compressor.

Figure 2:
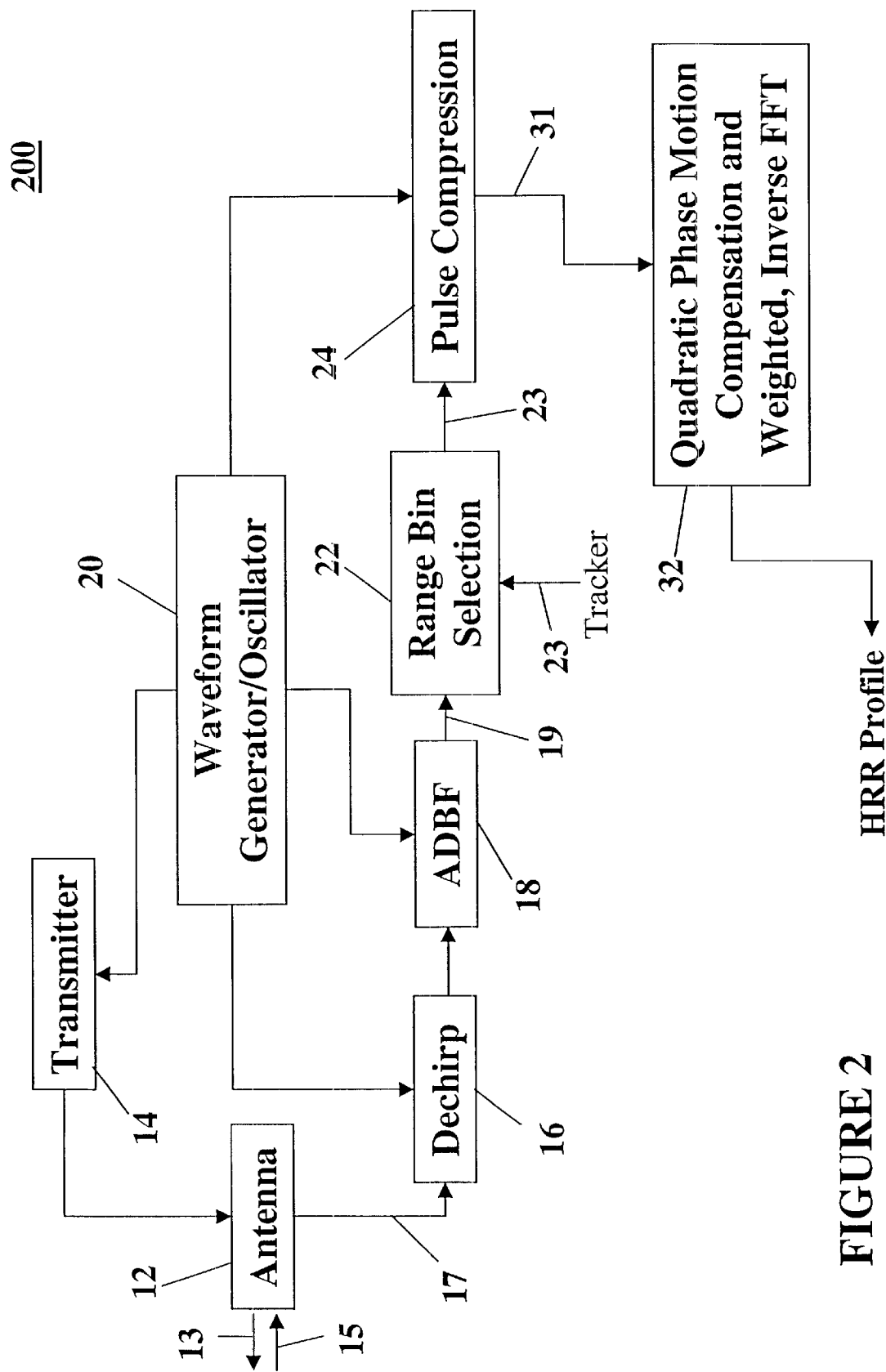
FIG. 2 is a functional block diagram of an exemplary HRR processing system in accordance with an embodiment of the present invention.

FIG. 2 is a functional block diagram of an exemplary HRR processing system 200 in accordance with an embodiment of the present invention. In an exemplary embodiment of the invention antenna 12 is an antenna array. Transmitter 14 receives a modulated center frequency from waveform generator/oscillator 20. Waveform generator/oscillator 20 is a frequency agile oscillator, thus being capable of changing frequencies rapidly. Transmitter 14 is a radar transmitter of any appropriate type well known in the art. Waveform generator 20 generates HRR waveforms used to create a HRR profile in accordance with the present invention. In an exemplary embodiment of the invention, the waveforms generated by waveform generator 20 comprise chirp waveforms and/or stepped frequency waveforms. Waveform generator 20 may also generate the waveform(s) used for detecting radar targets of interest. Waveforms may include LFM and stepped frequency waveforms.

Antenna 12 transmits radar signals 13 and receives reflected radar signals 15 (echoes), and provides signals 17 corresponding to these echoes to dechirper 16. Dechirper 16 dechirps the received echo signal. Dechirping comprises multiplying the chirped signal by a signal provided by the waveform generator/oscillator 20 having the same slope as the chirped signal. Dechirping produces a baseband signal, which is provided to digital beamformer 18. Adaptive digital beamformer 18 (ADBF) is a frequency dependent beamformer. Beam patterns are formed for each received echo from each segment of the transmitted HRR waveform in beamformer 18. In an exemplary embodiment of the invention, beams are adaptively formed in adaptive digital beamformer 18. Beamformer 18 provides beamformed signals 19 to range bin selector 22. In an exemplary embodiment of the invention, a target tracker operates in conjunction with HRR processing system 200 (tracker not shown in FIG. 2). The tracker updates information pertaining to the location of a target of interest (e.g., updates estimated angle of arrival and estimation range). Tracker information 25 is provided to range bin selector 22 to determine the target center, and the resultant signal 23 is provided to pulse compressor 24. The resultant signal is pulse compressed by pulse compressor 24 using the same type of waveform that was used to generate the HRR waveform (i.e., LFM or stepped frequency waveform). Pulse compression comprises a matched filtering process, wherein the provided signal is convolved with a replica of the HRR waveform.

The compressed signal 31 is motion compensated and then provided to an inverse FFT processor 32 to create an HRR profile. Quadratic phase motion compensation comprises multiplying the phase component of the compressed signal 31 by its complex conjugate to remove higher order (quadratic) terms, which are related to velocity. If this term is not removed, the HRR profile image may comprise modulation distortion. The quadratic phase motion compensated signal is In operation, a target of interest is detected and tracked using conventional narrowband waveforms. These narrowband waveforms may include CW and/or FM (linear and nonlinear) waveforms. Target tracking comprises updating and maintaining positional information pertaining to a target of interest (e.g., estimated arrival angel, estimated range). In an exemplary embodiment of the invention, once target tracking is commenced, HRR processing is commenced. HRR processing, in accordance with an exemplary embodiment of the invention, comprises transmitting an HRR waveform, receiving echo signals resulting from the transmitted HRR waveform, adaptively beamforming segments of the received echo signals to produce beamformed data, performing pulse compression on the beamformed data, performing quadratic phase motion compensation on the compressed data, providing the compensated compressed signal to an inverse FFT processor for producing an HRR profile (image).

Figure 3:
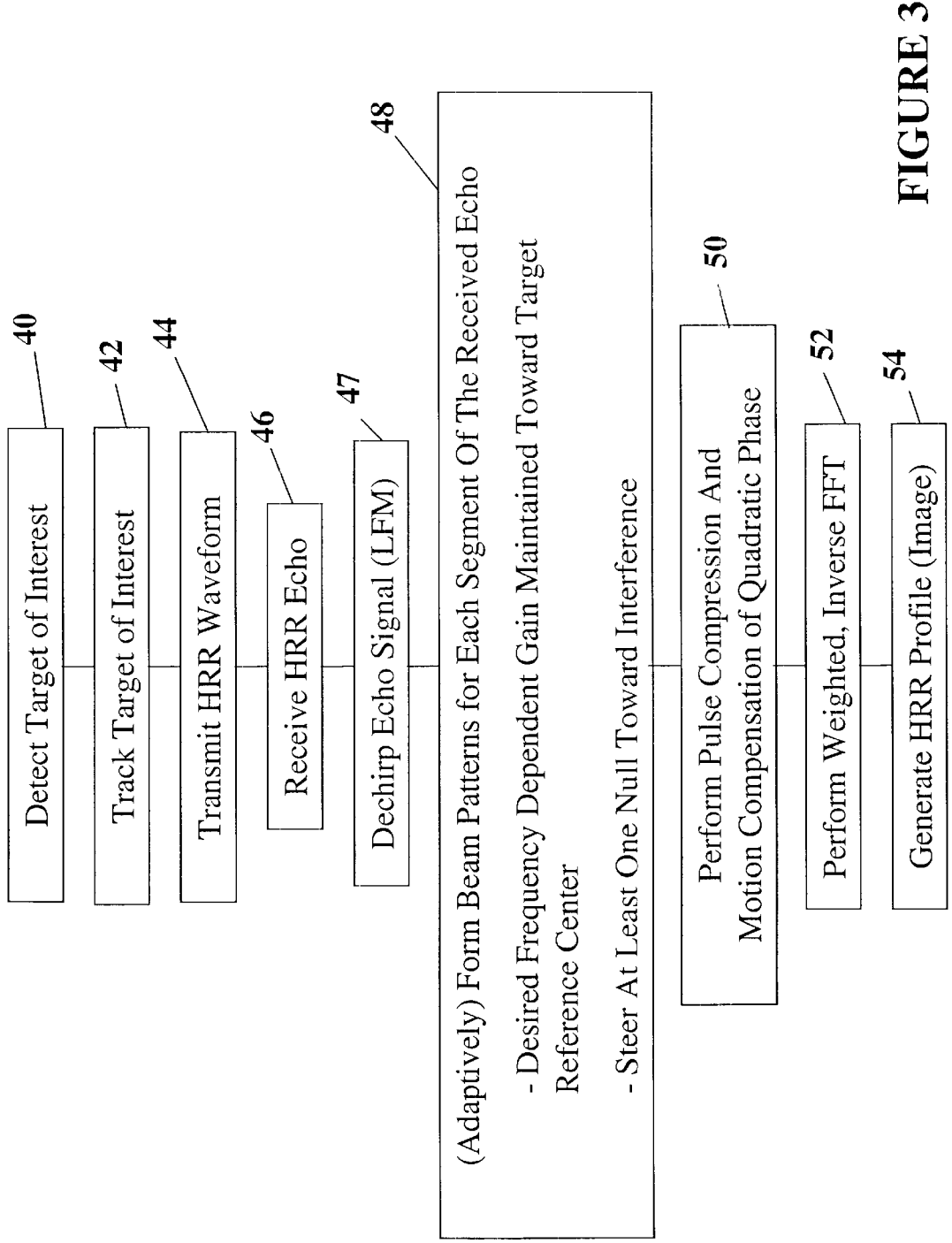
FIG. 3 is a flow diagram of an exemplary process for creating an HRR profile in accordance with an embodiment of the present invention.

FIG. 3 is a flow diagram of an exemplary process for creating an HRR profile in accordance with an embodiment of the present invention. A target of interest is detected in step 40 and tracked in step 42. This detection and tracking may comprise any means known in the art. HRR processing in accordance with the present invention may be accomplished independent of the detection and tracking of the target of interest. However, the quality of the HRR profile may be improved if motion compensation is performed in accordance with information provided by the tracker. The HRR waveform is transmitted in step 44. The HRR waveform may comprise an FM chirp waveform and/or a stepped frequency waveform. Echoes resulting from the interaction of the transmitted HRR waveform and objects including the target(s) of interest, ground clutter, targets not of interest, and other objects, are received in step 46. The chirped received echo signal is dechirped in step 47 using an LFM dechirping waveform having the same slope as the transmitted chirped signal.

Beamforming is performed in step 48. In an exemplary embodiment of the invention, beamforming is performed adaptively. Each echo signal corresponding to each segment 35 of the transmitted HRR waveform is beamformed. That is, a beam pattern is formed for each received echo signal corresponding to each segment 35, and weights are calculated for each beam pattern. If the transmitted HRR waveform is a chirp waveform, the received echo is separated into segments and beamforming is performed for each segment.

HRR processing is vulnerable to interference due to jamming because it requires a relatively wide operational bandwidth. This increases the chances that a jammer at a particular frequency will be in the operational bandwidth. HRR processing is also vulnerable to jamming interference because of the relatively long coherent integration time associated with HRR processing, thus increasing the likelihood that a jammer will transmit while the HRR echoes are being received. Therefore, it is generally desirable to eliminate jamming interference from the received signal (e.g., via cancellation or attenuating) in order to avoid performance degradation. Jamming interference may be canceled adaptively or manually.

In an exemplary embodiment of the invention, jamming interference is cancelled adaptively by forming beam patterns, wherein nulls of the beam patterns are steered in the direction of the source(s) of jamming interference. Many existing adaptive techniques require a training period where no signal is present (such as during a passive listening period), or a period where the signal value is low compared to the jamming interference signal (such as in a search radar system) in order to distinguish signal energy from jammer energy. However, during HRR processing, signal content is available in substantially all frequency samples. Thus, conventional adaptive techniques may cancel desired signal in addition to canceling jamming interference. Further, conventional adaptive techniques tend to modulate the signal of interest, causing degradation in sidelobe performance as a result of changing adaptive weight values. Thus, conventional adaptive techniques may degrade the image quality of the HRR profile. An HRR process in accordance with the present invention tends to overcome these problems by tracking the target center, with respect to range, for each pulse and constrain the adaptive processing such that the frequency dependent gain is maintained toward the target center for each adaptive processing block.

Still referring to FIG. 3, beams are formed with respect to the target center in accordance with information provided by the tracker. Weights are adaptively calculated for each received echo signal corresponding to each waveform segment 35 (see FIG. 1B) of the transmitted HRR waveform, and the weights are calculated to steer at least one null toward an interference, and within the constraints that frequency dependent gain is maintained toward the target center.

A mathematical description of the adaptive weights in accordance with the present invention follows. In this description, the underlying target model consists of K scattering centers located at positions represented by $R_k$, k=1, 2, ... K. The frequency measurement for each range bin of the received echo is in accordance with the following equation.

$$r_i = \sum_{k=1}^{K} g_{SA}(T_x^k, T_y^k, f_i) e^{-j2\pi f_i \left(\frac{2R_k}{c}\right)} + J_i + n_i, i = 0, 1, \ldots, N-1, \quad (1)$$

where, $r_i$ is the vector of the array (or sub-array) measurement for the selected range bin of the $i^{th}$ pulse, $g_{SA}$ is the array (or sub-array) gain vector at frequency $f_i$ and steering direction $(T_x, T_y)$, $J_i$ and $n_i$ are the jamming interference and noise component, respectively, c is the speed of light in a in the transmission medium, $R_k$ is the position of the $k^{th}$ scattering center, and $T_x$ is the azimuth directional cosine and $T_y$ is the elevation directional cosine calculated in accordance with the following equations.

$$T_x = \cos(\beta)\sin(\theta) \quad (2)$$

$$T_y = \sin(\beta), \quad (3)$$

where θ is the steering angle, in azimuth, off boresight of the antenna array, and, β is the steering angle, in elevation, off boresight of the antenna array.

Because there is no passive listening period for wideband imaging (HRR profile), there is a potential for signal cancellation. This is due to the adaptive beamforming algorithm attempting to calculate weights, which steers a null towards the signal. This signal cancellation can be avoided if a constraint is used such that the frequency dependent gain is steered toward the target reference center. This constraint will maintain the mainlobe of the beam pattern steered substantially toward the target center, and allow nulls to be formed in the direction of jamming interference. Weights formed within this constrain, in accordance with an exemplary embodiment of the invention are calculated in accordance with the following equation.

$$W_i = \frac{C_i^{-1} g_{SA}(T_x^S, T_y^S, f_i)}{g_{SA}(T_x^S, T_y^S, f_i)^H C_i^{-1} g_{SA}(T_x^S, T_y^S, f_i)} g_\Sigma(T_x^S, T_y^S, f_i), \quad (4)$$

where, the index i indicates the number of processing blocks into which the received echoes are separated for processing, $C_i$ is the covariance matrix estimate of the $i^{th}$ processing block, $W_i$ is the adaptive weight of the $i^{th}$ block, $g_{SA}(T_x, T_y, f_i)$ is the array (or sub-array) gain vector used as the steering vector, H indicates the complex conjugate transpose, $g_{93}(T_x^S, T_y^S, f_i)$ is the sum beam gain (tapered beam pattern steered toward the target) at frequency $f_i$ and steering direction $(T_x^S, T_y^S)$, and the superscript S indicates the steering direction toward the target center, which is constant for each processing block.

A sum beam is typically the weighted sum of the sub-array measurements. Sum beam antenna patterns usually peak at the desired signal direction and have low sidelobes. Accordingly, a desired sum beam gain is achieved and maintained towards the target reference for all pulses while jamming is cancelled. In this manner, the image or HRR profile quality is maintained with low range sidelobes and can be used for target discrimination or recognition applications.

Referring again to FIG. 3, pulse compression is then performed on the beamformed data at step 50. The selection of the bin representing the target center is determined in accordance with target range information provided by the tracker. This is followed by pulse compression and quadratic phase motion compensation. This information aids in compensating for target motion. Target motion compensation improves the quality of the HRR profile (image) by reducing quadratic phase error.

Tapered, inverse FFT processing is performed on the quadratic phase motion compensated data at step 52. Weighted tapering is optional, however weighted tapering processing may enhance the quality of the HRR profile. Processing a wideband signal using narrowband techniques (e.g., dechirping with a linear frequency modulated waveform followed by a bandpass filter) is also referred to as stretch processing. Stretch processing is described in a document entitled "Nulling Over Extremely Wide Bandwidths When Using Stretch Processing", proceedings of Adaptive Sensor Array Processing (ASAP), March 1999, which is hereby incorporated by reference in its entirety. Stretch processing is a process, which enables processing of wideband waveforms (e.g., HRR waveforms) with narrowband processing techniques. Stretch processing comprises converting pulse delay time, in range, to frequency. Thus the received energy from any one range has a constant frequency, and the received energy from different ranges may be separated by well know narrowband processing techniques, such as narrowband filtering with a plurality of narrowband filters via a Fast Fourier Transform (FFT). Thus, targets, which are relatively closely spaced in range, are distinguishable in the HRR profile. The pulse compressed, weighted, tapered, inverse FFT signals are formed into images in step 54.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by computer processor 32, the computer processor 32 becomes an apparatus for practicing the invention. The present invention may also be embodied in the form of computer program code, for example, whether stored in a storage medium, loaded into and/or executed by computer processor 32, or transmitted over some transmission medium, such as over electrical wiring or cabling, through fiber optics, or via electromagnetic radiation, wherein, when the computer program code is loaded into and executed by computer processor 32, the computer processor 32 becomes an apparatus for practicing the invention. When implemented on a general-purpose processor, the computer program code segments configure the processor to create specific logic circuits.

Figure 4:
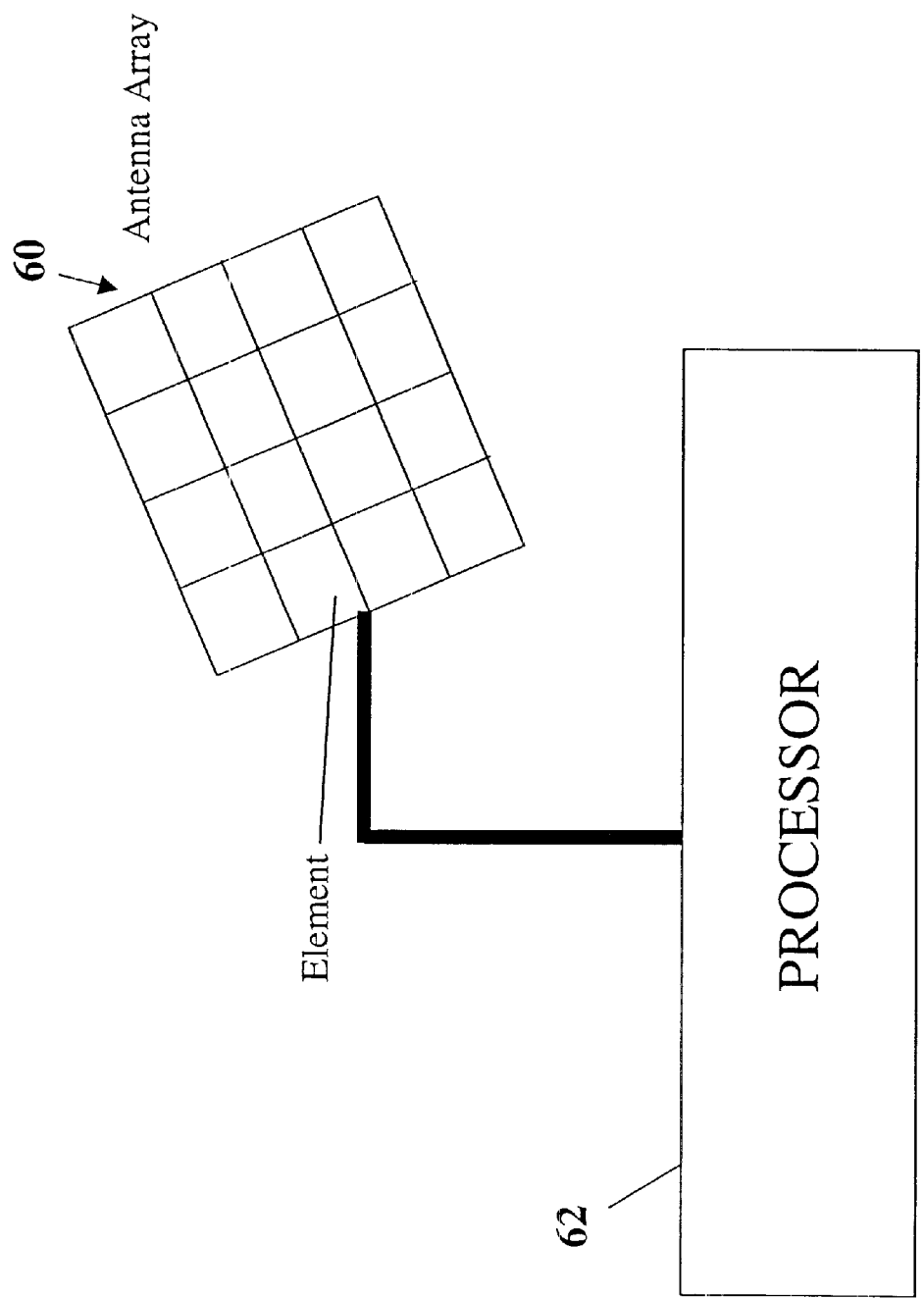
FIG. 4 is a block diagram of a radar system comprising an antenna array 60 and computer processor 62 in accordance with an exemplary embodiment of the invention.

The present invention may be embodied in the form of computer-implemented processes and apparatus for practicing those processes. FIG. 4 is a block diagram of a radar system comprising an antenna array 60 and computer processor 62 in accordance with an exemplary embodiment of the invention. HRR waveforms are created by processor 62 and provided to antenna array 60. HRR waveforms are transmitted by antenna array 60. Reflected energy resulting for the transmission of the HRR waveforms is received by antenna array 60 and is provided to computer processor 62. Computer processor 62 performs processes for forming beam patterns, performing pulse compression, performing stretch processing, and generating images in accordance with the present invention, as herein described. Processing may also be performed by special purpose hardware.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by computer processor 62, the computer processor 62 becomes an apparatus for practicing the invention. The present invention may also be embodied in the form of computer program code, for example, whether stored in a storage medium, loaded into and/or executed by computer processor 62, or transmitted over some transmission medium, such as over electrical wiring or cabling, through fiber optics, or via electromagnetic radiation, wherein, when the computer program code is loaded into and executed by computer processor 62, the computer processor 62 becomes an apparatus for practicing the invention. When implemented on a general-purpose processor, the computer program code segments configure the processor to create specific logic circuits.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method for developing a high resolution range (HRR) profile for a radar target of interest in the presence of jamming interference, said method comprising the steps of:

transmitting an HRR waveform;

receiving an echo signal resulting from said transmitted HRR waveform, said echo signal comprising a plurality of echo signal segments;

forming a respective beam pattern for each echo signal segment, wherein at least one null of each beam pattern is steered toward at least one interference and a frequency dependent gain of each beam pattern is maintained toward a center of said target of interest; and producing an HRR target profile from said beam patterns.

2. A method in accordance with claim 1, further comprising the steps of:

detecting said target of interest; and tracking said target of interest.

3. A method in accordance with claim 2, wherein said echo signal is compensated for motion of said target of interest.

4. A method in accordance with claim 1, wherein said beam patterns are calculated adaptively.

5. A method in accordance with claim 1, wherein said HRR waveform comprises at least one of a chirp waveform and a stepped frequency waveform.

6. A method in accordance with claim 1, further comprising the step of filtering said beam patterns with a plurality of narrowband filters.

7. A method in accordance with claim 1, wherein weights used to form said beam patterns are calculated in accordance with the following equation:

$$W_i = \frac{C_i^{-1} g_{SA}(T_x^S, T_y^S, f_i)}{g_{SA}(T_x^S, T_y^S, f_i)^H C_i^{-1} g_{SA}(T_x^S, T_y^S, f_i)} g_\Sigma(T_x^S, T_y^S, f_i)$$

wherein:

i is an index indicating which echo signal segment is being processed;

$C_i$ is a covariance matrix estimate of an $i^{th}$ echo signal segment;

$W_i$ is said weight of said $i^{th}$ echo signal segment;

$g_{SA}(T_x, T_y, f_i)$ is an array gain vector used as a steering vector;

H indicates a complex conjugate transpose;

$g_\Sigma(T_x^S, T_y^S, f_i)$ is a sum beam gain at frequency $f_i$ and steering direction $(T_x^S, T_y^S)$;

S is a superscript indicating a steering direction toward said center of said target of interest;

$T_x$ is an azimuth directional cosine calculated in accordance with the following equation, $T_x = \cos(\beta)\sin(\theta)$, wherein $\theta$ is a steering angle, in azimuth, off boresight of an antenna array and $\beta$ is a steering angle, in elevation, off boresight of said antenna array;

$T_y$ is an elevation directional cosine calculated in accordance with the following equation, $T_y = \sin(\beta)$.

8. A radar system creating a high range resolution (HRR) profile, said system comprising:
- an HRR waveform generator for generating an HRR waveform;
- an antenna array for transmitting said HRR waveform and for receiving an echo signal resulting from said transmitted HRR waveform, said echo signal comprising a plurality of echo signal segments;
- a beamformer for forming a respective beam pattern for each echo signal segment, wherein at least one null of each beam pattern is steered toward at least one interference and a frequency dependent gain of each beam pattern is maintained toward a center of said target of interest; and
- a pulse compressor for compressing said echo signal.

9. A system in accordance with claim 8, further comprising:
- a detector for detecting said target of interest; and
- a tracker for tracking said target of interest.

10. A system in accordance with claim 9, further comprising a motion compensator for compensating motion of said target of interest encoded within said echo signal.

11. A system in accordance with claim 8, wherein said beamformer is an adaptive beamformer.

12. A system in accordance with claim 8, wherein said HRR waveform comprises at least one of a chirp waveform and a stepped frequency waveform.

13. A system in accordance with claim 8, further comprising a dechirper for dechirping said echo signal.

14. A system in accordance with claim 8, wherein weights used to calculate said beam patterns are accordance with the following equation:

$$W_i = \frac{C_i^{-1} g_{SA}(T_x^S, T_y^S, f_i)}{g_{SA}(T_x^S, T_y^S, f_i)^H C_i^{-1} g_{SA}(T_x^S, T_y^S, f_i)} g_\Sigma(T_x^S, T_y^S, f_i)$$

wherein:
- i is an index indicating which echo signal segment is being processed;
- $C_i$ is a covariance matrix estimate of an $i^{th}$ echo signal segment;
- $W_i$ is said weight of said $i^{th}$ echo signal segment;
- $g_{SA}(T_x, T_y, f_i)$ is an array gain vector used as a steering vector;
- H indicates a complex conjugate transpose;
- $g_\Sigma(T_x^S, T_y^S, f_i)$ is a sum beam gain at frequency $f_i$ and steering direction $(T_x^S, T_y^S)$;
- S is a superscript indicating a steering direction toward said center of said target of interest;
- $T_x$ is an azimuth directional cosine calculated in accordance with the following equation, $T_x = \cos(\beta)\sin(\theta)$, wherein $\theta$ is a steering angle, in azimuth, off boresight of an antenna array and $\beta$ is a steering angle, in elevation, off boresight of said antenna array; and
- $T_y$ is an elevation directional cosine calculated in accordance with the following equation, $T_y = \sin(\beta)$, wherein $\beta$ is a steering angle, in elevation, off boresight of said antenna array.

15. A computer readable medium having embodied thereon a computer program for causing a computer to create a high resolution range (HRR) profile for a radar target of interest in the presence of jamming interference, the computer readable program comprising:
- means for causing said computer to transmit an HRR waveform, wherein said HRR waveform comprises at least one of a chirp waveform and a stepped frequency waveform;
- means for causing said computer to receive an echo signal resulting from said transmitted HRR waveform, said echo signal comprising a plurality of echo signal segments;
- means for causing said computer to form a respective beam pattern for each echo signal segment, wherein at least one null of each beam pattern is steered toward at least one interference and a frequency dependent gain of each beam pattern is maintained toward a center of said target of interest; and
- means for causing said computer to create an HRR profile from said beam patterns.

16. A computer readable medium in accordance with claim 15, further comprising:
- means for causing said computer to detect said target of interest;
- means for causing said computer to track said target of interest; and
- means for causing said computer to dechirp said echo signal.

17. A computer readable medium in accordance with claim 16, wherein said computer program further comprises means for causing said computer to compensate said echo signal for motion of said target of interest.

18. A computer readable medium in accordance with claim 15, wherein said computer program further comprises means for causing said computer to form said beam patterns adaptively.

19. A computer readable medium in accordance with claim 15, wherein weights used to calculate said beam patterns are accordance with the following equation:

$$W_i = \frac{C_i^{-1} g_{SA}(T_x^S, T_y^S, f_i)}{g_{SA}(T_x^S, T_y^S, f_i)^H C_i^{-1} g_{SA}(T_x^S, T_y^S, f_i)} g_\Sigma(T_x^S, T_y^S, f_i)$$

wherein:
- i is an index indicating which echo signal segment is being processed;
- $C_i$ is a covariance matrix estimate of an $i^{th}$ echo signal segment;
- $W_i$ is said weight of said $i^{th}$ echo signal segment;
- $g_{SA}(T_x, T_y, f_i)$ is an array gain vector used as a steering vector;
- H indicates a complex conjugate transpose;
- $g_\Sigma(T_x^S, T_y^S, f_i)$ is a sum beam gain at frequency $f_i$ and steering direction $(T_x^S, T_y^S)$;
- S is a superscript indicating a steering direction toward said center of said target of interest;
- $T_x$ is an azimuth directional cosine calculated in accordance with the following equation, $T_x = \cos(\beta)\sin(\theta)$, wherein $\theta$ is a steering angle, in azimuth, off boresight of an antenna array and $\beta$ is a steering angle, in elevation, off boresight of said antenna array; and $T_y$ is an elevation directional cosine calculated in accordance with the following equation, $T_y = \sin(\beta)$, wherein $\beta$ is a steering angle, in elevation, off boresight of said antenna array.

20. A radar system for developing a high resolution range (HRR) scene profile comprising:

a transmitter for generating and transmitting an HRR waveform;

a receiver for receiving an incoming waveform including returns from a radar scene;

a processor coupled to the receiver for transforming the received incoming waveform to produce and HRR scene profile;

said processor, said processor operative to form beam patterns for portions of said incoming waveform and for steering at least one null of each beam pattern toward an interference for producing said profile.

* * * * *